US007542841B2

(12) United States Patent
Yahia et al.

(10) Patent No.: US 7,542,841 B2
(45) Date of Patent: Jun. 2, 2009

(54) METHOD AND DEVICE FOR CONTROLLING AN INTERNAL COMBUSTION ENGINE

(75) Inventors: Khaled Ben Yahia, Stuttgart (DE); Dara Torkzadeh, Renningen-Malmsheim (DE); Katharina Michalik, Stuttgart-Zuffenhausen (DE); Anton Siemens, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 11/879,848

(22) Filed: Jul. 18, 2007

(65) Prior Publication Data

US 2008/0027621 A1 Jan. 31, 2008

(30) Foreign Application Priority Data

Jul. 19, 2006 (DE) ........................ 10 2006 033 483

(51) Int. Cl.
*G06F 19/00* (2006.01)
*F02M 7/00* (2006.01)
*G01M 15/00* (2006.01)

(52) U.S. Cl. ........................ 701/103; 701/110; 123/435; 73/114.16

(58) Field of Classification Search ......... 701/101-103, 701/106, 110, 111, 115; 123/435, 436, 676; 73/114.02, 114.04, 114.06, 114.16, 114.25
See application file for complete search history.

(56) References Cited

U.S. PATENT DOCUMENTS

| | | | | |
|---|---|---|---|---|
| 4,621,603 | A * | 11/1986 | Matekunas | 123/435 |
| 6,390,063 | B1 * | 5/2002 | Obata et al. | 123/399 |
| 2007/0163557 | A1 * | 7/2007 | Layher et al. | 701/103 |

* cited by examiner

*Primary Examiner*—Willis R Wolfe, Jr.
(74) *Attorney, Agent, or Firm*—Kenyon & Kenyon LLP

(57) ABSTRACT

A method and a device for controlling an internal combustion engine in which a combustion chamber quantity characterizing the combustion process is ascertained on the basis of input quantities. This takes place using a polytropic exponent. The polytropic exponent is ascertained on the basis of performance characteristics of the internal combustion engine.

6 Claims, 2 Drawing Sheets

METHOD AND DEVICE FOR CONTROLLING AN INTERNAL COMBUSTION ENGINE

FIELD OF THE INVENTION

The present invention is directed to a method and a device for controlling an internal combustion engine in which a combustion chamber quantity characterizing the combustion process is ascertained on the basis of input quantities.

BACKGROUND INFORMATION

Occurrence of harmful substances in the exhaust gas of an internal combustion engine may be reduced by optimizing the fuel combustion. To optimize the individual combustion steps, the different state parameters of the internal combustion engine must be accurately known. These include in particular the combustion chamber quantities characterizing the combustion process such as, for example, the pressure in the combustion chamber and the temperature in the combustion chamber. These quantities vary over the stroke of the piston of the internal combustion engine as a function of the heat loss properties of the engine and the composition of the gas. The gas properties of air in the combustion chamber vary, for example, due to the admixing of exhaust gas, in particular via exhaust gas recirculation, and/or due to water or water vapor.

SUMMARY

An example device according to the present invention and an example method according to the present invention may have the advantage that real time calculation of the combustion chamber quantities characterizing the combustion process such as, for example, the combustion chamber pressure and the combustion chamber temperature in the compression phase during the engine operation is possible. Calculating a gas composition that is different from that of pure air, as is the case with active exhaust gas recirculation, for example, is also possible. Forward-looking combustion optimization with the help of combustion chamber quantities characterizing the combustion process such as pressure and temperature is thus possible. This makes forward-looking regulation and/or control possible. The subclaims provide particularly advantageous embodiments.

BRIEF DESCRIPTION OF THE DRAWINGS

Exemplary embodiments of the present invention are illustrated in the figures and explained in greater detail below.

DESCRIPTION OF EXAMPLE EMBODIMENTS

Figure 1:
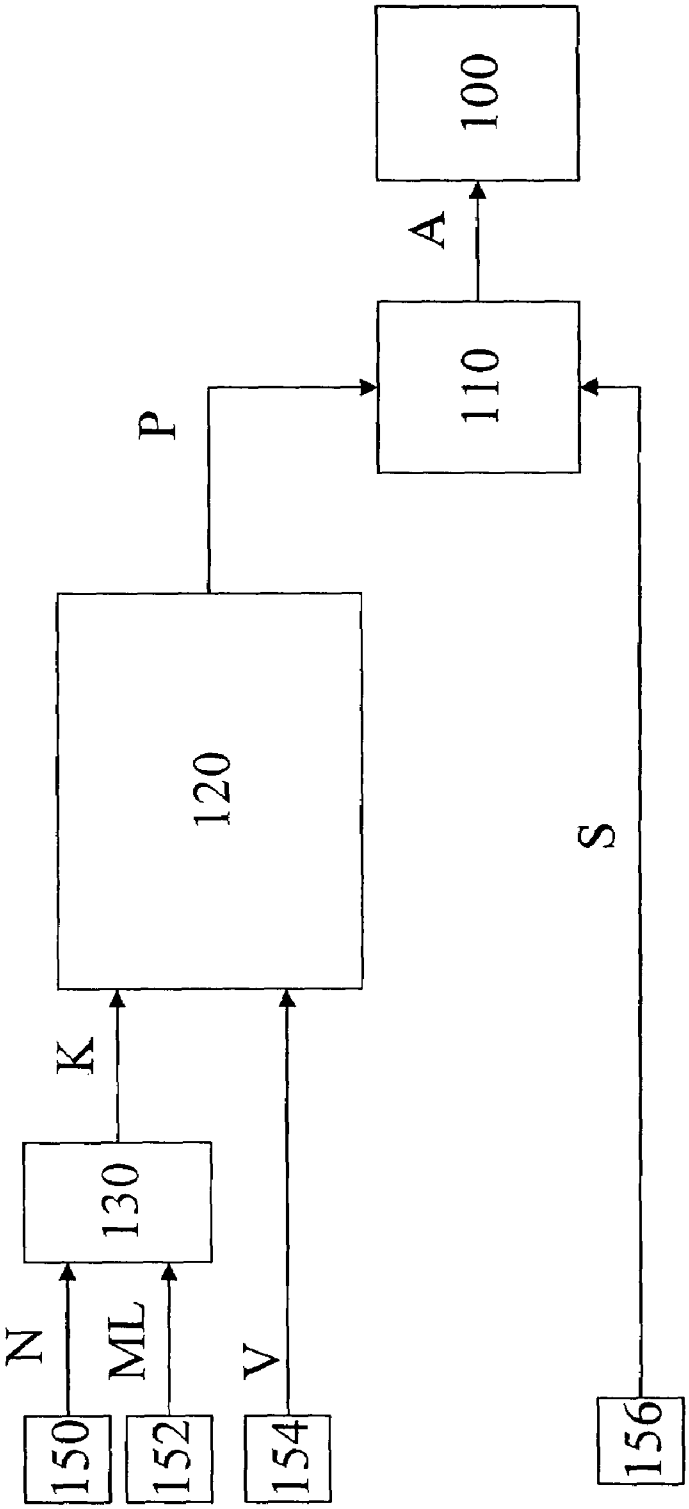
FIG. 1 shows a device and a method for controlling an internal combustion engine.

FIG. 1 shows an example device and a method for controlling an internal combustion engine. In FIG. 1, an actuator is labeled 100. It receives an activation signal A from a controller 110. Controller 110 calculates activation signal A on the basis of different quantities such as, for example, output signal S of a sensor 156 and output signal P of a pressure calculator 120. This pressure calculator receives different signals such as quantity V, which is provided by a setpoint selection element 154 and a quantity K which is provided by a model 130. Model 130 calculates quantity K on the basis of different performance characteristics such as, for example, rotational speed N of the internal combustion engine and/or an air quantity ML. Rotational speed N of the internal combustion engine is provided by a speed sensor 150. Air quantity value ML is also provided by a sensor 152.

In alternative embodiments, it may be provided that instead of sensors 150, 152, 154, and/or 156, these quantities are ascertained on the basis of other quantities. In particular, models may be provided which calculate individual or multiple quantities on the basis of other performance characteristics or from control quantities available internally in the controller. Furthermore, in addition to these illustrated quantities, further quantities from controller 110, pressure calculator 120, and/or model 130 may be taken into account and used.

It is furthermore possible to ascertain other quantities which characterize the combustion process using the same procedure or a modified procedure.

Pressure calculator 120 calculates combustion chamber pressure P according to the following formula:

$$Pz = p_0\left(\frac{V0}{Vz}\right)^K$$

The particular instantaneous combustion chamber pressure is labeled Pz. P0 identifies the initial value of the combustion chamber pressure, V0 the initial volume of the cylinder, and Vz the particular instantaneous cylinder volume. K denotes the polytropic exponent.

It has been recognized according to the present invention that polytropic exponent K is a function of different performance parameters of the internal combustion engine. These include, among other things, exhaust gas recirculation rate EGR, cooling water temperature T, rotational speed N, and air mass ML. Furthermore, PHI denotes the varying crankshaft angle, and ti the time elapsed since the closing of the intake valve. Taking these quantities into account, polytropic exponent K is obtained according to the following formula:

$$K=A1+A2*PHI/ti+A3*T/ti+A4*N/ti+A5*EGR*ti+A6*PHI+A7*ML/ti$$

Quantities A1 through A7 are parameters which are characteristic for the particular internal combustion engine and are ascertained at least once during the lifetime of the internal combustion engine. In an improved embodiment it is provided that each of these parameters is recalculated in defined intervals and/or in the presence of defined operating states.

In simplified specific embodiments, one or more of the quantities may be assumed to be constant. This means that the particular factor Ai becomes zero and the quantity is taken into account in factor A1.

To ascertain the parameters, the pressure in the combustion chamber is plotted for different rotational speeds, engine temperatures, exhaust gas recirculation rates, and cylinder charges, i.e., different air quantities. Polytropic exponent K may be ascertained at each measured pressure by rearranging the equation.

After being assigned to operating points, the parameters are determined by minimizing the error squares. In doing so, the maximum error is also minimized. It is furthermore provided that the values of the individual gradients are calculated via the individual input quantities. This takes place against the background that input quantities affected by tolerances are used in the calculation in the engine control unit. The resulting error should not exceed a predefined limit.

This means that polytropic exponent K is calculated as a function of the angular position or of time. To calculate the polytropic exponent, at least one of the following quantities is used as a performance characteristic: air quantity, cooling water temperature, rotational speed, exhaust gas recirculation rate. Polytropic exponent K is preferably ascertained for all angular positions for defined discrete values of the angular position or of time. This means that variation over time or variation over the angular position is ascertained. The point in time or the angular position at which the intake valve of the combustion chamber in question closes is used as the starting value. This means that the calculation is performed as a function of the angular position or of time.

There is preferably a linear relationship between the polytropic exponent and the particular performance characteristics.

This polytropic exponent K is needed, among other things, to calculate quantities which characterize the combustion process. These are preferably the combustion chamber pressure and/or the combustion chamber temperature. On the basis of different input quantities, the quantity characterizing the combustion process is calculated. One of these quantities is polytropic exponent K, which is ascertained on the basis of performance characteristics of the internal combustion engine. At least one of the following quantities is used as a performance characteristic: air quantity, cooling water temperature, rotational speed of the internal combustion engine, exhaust gas recirculation rate, time, or angular position since the closing of the intake valve.

Using the above-described procedure, an accurate yet simple procedure is provided for calculating polytropic exponent K in the motor vehicle. The polytropic exponent is thus available for calculating further quantities in the motor vehicle, in particular for controlling the internal combustion engine.

Pressure calculator 120 calculates the combustion chamber pressure according to the above formula. Controller 110 then calculates activation signal A for an actuating element on the basis of this calculated combustion chamber pressure P and further quantities S. This actuating element may be, on the one hand, an actuating element for influencing the fuel metering, such as an injector of a common rail system, for example. Furthermore, it may also be provided that other actuating elements such as an actuating element for influencing the fresh air quantity supplied to the internal combustion engine or other manipulated variables which influence the combustion process of an internal combustion engine takes place.

Figure 2:
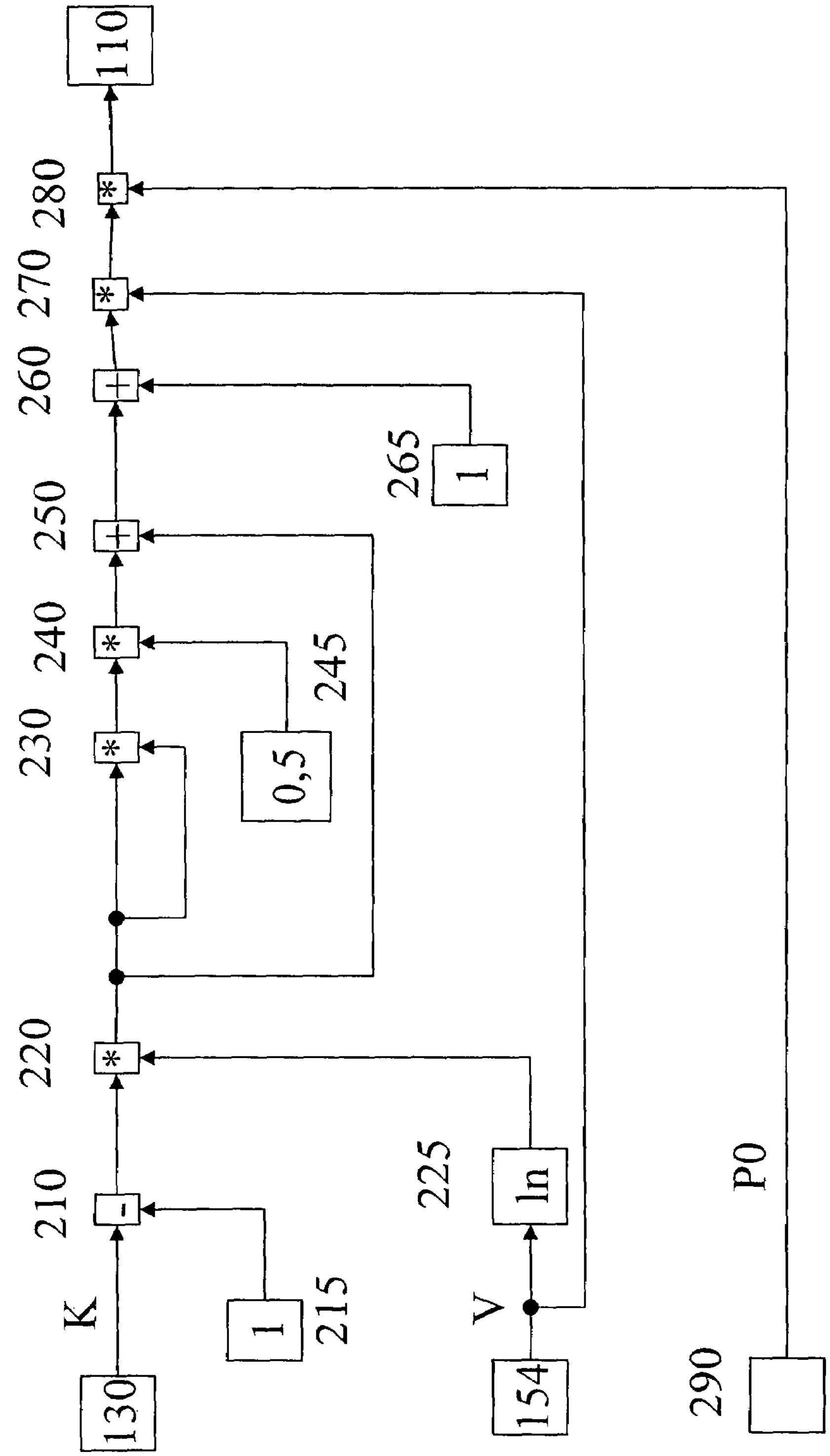
FIG. 2 shows the calculation of individual quantities in detail.

FIG. 2 shows pressure calculation 120 in greater detail. Components previously described in FIG. 1 are identified in FIG. 2 with the same reference numerals.

In calculating the cylinder pressure according to the above formula, the problem arises that exponent K must be known or assumed to be constant. There is the additional problem that the calculation is to be performed using simple algebraic equations which may be performed in a control unit.

In the above formula $$Pz = p_0\left(\frac{V0}{Vz}\right)^K,$$

the expression $$\left(\frac{V0}{Vz}\right)^K = v^K$$

is to be calculated.

Pz denotes the particular cylinder pressure at a defined angular position or at a defined point in time. V0 denotes the cylinder volume when the intake valve closes. Vz denotes the cylinder volume at the defined angular position or point in time at which pressure Pz is calculated. Quantities V0 and variation Vz over the varying crankshaft angle are constant or may be calculated from the geometry of the combustion chamber and the particular angular position. The ratio v=V0/Vz is also known as the compression ratio.

According to the present invention, the expression $v^K$ is calculated as exponential function $e^{K*ln(v)}$. It is advantageous in particular if the polytropic exponent is ascertained with the aid of the above-described procedure. In one embodiment of the procedure, it may also be provided that the polytropic exponent is ascertained with the aid of other procedures or assumed to be approximately constant.

Such an exponential term may normally be expanded in a convergent series. The problem here is that the logarithm converges only in limited ranges if an expansion in a series is used for its calculation. The procedure according to the present invention uses very little computing resources, so that it may be performed in a control unit in the vehicle using a reasonable amount of resources. At the same time, high computing accuracy results.

Normally quantity V varies in the order of magnitude between value 1 and value 20. Expansion of the logarithm in a series using these values is also possible but, if a reasonable amount of computing steps are used, it may not result in satisfactory accuracy. Therefore, it is provided according to an embodiment of the present invention that the logarithm of quantity V is stored in a characteristics map. This characteristics map is preferably filled with data during calibration.

Expansion in a series is used for calculating the exponential term. Such an expansion in a series generally always converges; in particular in the case of small exponents, the series may be interrupted after a few terms. In the case of the given magnitudes of quantity V, the exponent is in the range between 0 and approximately 5. To achieve high accuracy in this range, the series should not be interrupted before the seventh term; this requires considerable computing resources. It is therefore provided according to the present invention that the quantity be calculated according to the following formula:

$$v^K = V\ e^{(k-1)*ln(v)}$$

The term in the exponent now assumes values in the range between 0 and approximately 1.8. For these figures, a quadratic expansion in a series is sufficient. If expression (K−1)*ln(V) is substituted by quantity t, the following formula results for term $v^K$:

$$V^K = V*(1+t+t^2/2).$$

According to an example embodiment of the present invention, this calculation is performed in the pressure calculator. The calculation is shown in detail in FIG. 2. Quantity K is supplied to a node 210 to whose second input the constant value 1 from setpoint selection element 215 is applied. The output quantity of node 210, which corresponds to quantity K−1, is supplied to node 220, to whose second input the output of a characteristics map 225 is applied, to whose input, in turn, quantity V is applied. Quantity V is provided by setpoint selection element 154. This element is preferably designed as a characteristics map in which compression ratio V is stored as a function of the angular position or of time.

The product of the logarithm of quantity V and value (K−1) appears at the output of node 220. The output signal of node 220 corresponds to quantity t. Quantity t is supplied to node 230, to whose second input quantity t is also applied. Product t*t therefore appears at the output of node 230. It is multiplied by the output signal of constant setpoint selection element 245, i.e., value 0.5 at node 240. The output signal of node 240 is supplied to node 250, where signal t is added to this quantity. In node 260, constant value 1 of constant setpoint selection element 265 is added. At the following node 270, the output signal of node 260 is multiplied by quantity V. Quantity $V^K$ is thus available at the output of node 270. By multiplying by pressure value P0 at node 280, the instantaneous combustion chamber pressure is available at the output of node 280.

Using this procedure, the instantaneous combustion chamber pressure may be ascertained for each angular position or at each point in time. It is advantageous in particular if quantity K is calculated according to the above formula. In a simplified specific embodiment, this quantity may also be assumed to be constant or taken from a characteristics map.

This means that a combustion chamber quantity characterizing the combustion process is ascertained on the basis of input quantities. This takes place using a polytropic exponent. The combustion chamber quantity is ascertained with the aid of an exponential function. It is advantageous in particular if the exponential function is approximated with the aid of a quadratic term. It is advantageous in particular if the combustion chamber pressure is ascertained as a combustion chamber quantity. The combustion chamber pressure is ascertained on the basis of compression ratio V and polytropic exponent K.

What is claimed is:

1. A device for controlling an internal combustion engine, comprising:

an arrangement adapted to ascertain a combustion chamber quantity characterizing a combustion process based on input quantities using a polytropic exponent, the polytropic exponent being ascertained based on performance characteristics of the internal combustion engine.

2. A method for controlling an internal combustion engine comprising:

ascertaining a combustion chamber quantity characterizing a combustion process based on input quantities by using a polytropic exponent, the polytropic exponent being ascertained based on performance characteristics of the internal combustion engine.

3. The method as recited in claim 2, wherein a combustion chamber pressure is ascertained as a combustion chamber quantity.

4. The method as recited in claim 2, wherein the ascertainment occurs as a function of one of angular position or time.

5. The method as recited in claim 2, wherein at least one of the following quantities is used as a performance characteristic: air quantity, cooling water temperature, rotational speed of the internal combustion engine, exhaust gas recirculation rate, time or angular position since closing an intake valve.

6. The method as recited in claim 2, wherein there is a linear relationship between the polytropic exponent and the performance characteristics.

* * * * *